United States Patent [19]

Nomura et al.

[11] Patent Number: 5,604,638
[45] Date of Patent: Feb. 18, 1997

[54] ANTI-REFLECTION STRUCTURE FOR ZOOM LENS BARREL

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 353,210

[22] Filed: Dec. 1, 1994

[30] Foreign Application Priority Data

Dec. 1, 1993 [JP] Japan .................................. 5-64451
Dec. 6, 1993 [JP] Japan .................................. 5-65077

[51] Int. Cl.$^6$ .................................................. G02B 15/14
[52] U.S. Cl. ................................... 359/704; 359/823
[58] Field of Search ............................... 359/694, 695, 359/696, 697, 698, 699, 700, 701, 702, 703, 704, 705, 706, 819, 825, 826, 829, 830, 823

[56] References Cited

U.S. PATENT DOCUMENTS

| | | | |
|---|---|---|---|
| 4,911,542 | 3/1990 | Nishio et al. ........................ | 359/823 |
| 4,944,030 | 5/1993 | Haraguchi et al. .................. | 354/403 |
| 5,012,273 | 4/1991 | Nakamura et al. .................. | 554/485 |
| 5,033,819 | 7/1991 | Tanaka ................................. | 350/255 |
| 5,034,762 | 7/1991 | Kohmoto ............................. | 354/192.12 |
| 5,115,350 | 5/1992 | Tanaka ................................. | 359/823 |
| 5,144,493 | 9/1992 | Nomura ............................... | 359/700 |
| 5,221,993 | 6/1993 | Nomura ............................... | 359/601 |
| 5,343,331 | 8/1994 | Kohmoto et al. .................... | 359/823 |

*Primary Examiner*—Georgia Y. Epps
*Assistant Examiner*—Dawn-Marie Bey
*Attorney, Agent, or Firm*—Greenblum & Bernstein P.L.C.

[57] ABSTRACT

An anti-reflection structure for a zoom lens barrel is provided in a camera to prevent harmful internal reflection caused by the surface of a shaft for transmitting rotation force. The anti-reflection structure includes a rotation cylinder linearly movable in the direction of the optical axis while rotating; a shaft positioned in the rotation cylinder and rotated by a drive source, and a pinion fitted on the shaft to be slidable in the axial direction thereof so as to move in a direction parallel to the optical axis together with the rotation cylinder. The pinion transmits the rotation of the shaft to the rotation cylinder. A contact guide portion is formed on the shaft for allowing the pinion to slidably move on the contact guide portion and a non-contact portion is formed on the shaft which does not contact the pinion. An anti-reflection mechanism is formed on the non-contact portion for preventing light from being reflected on the non-contact portion.

12 Claims, 14 Drawing Sheets

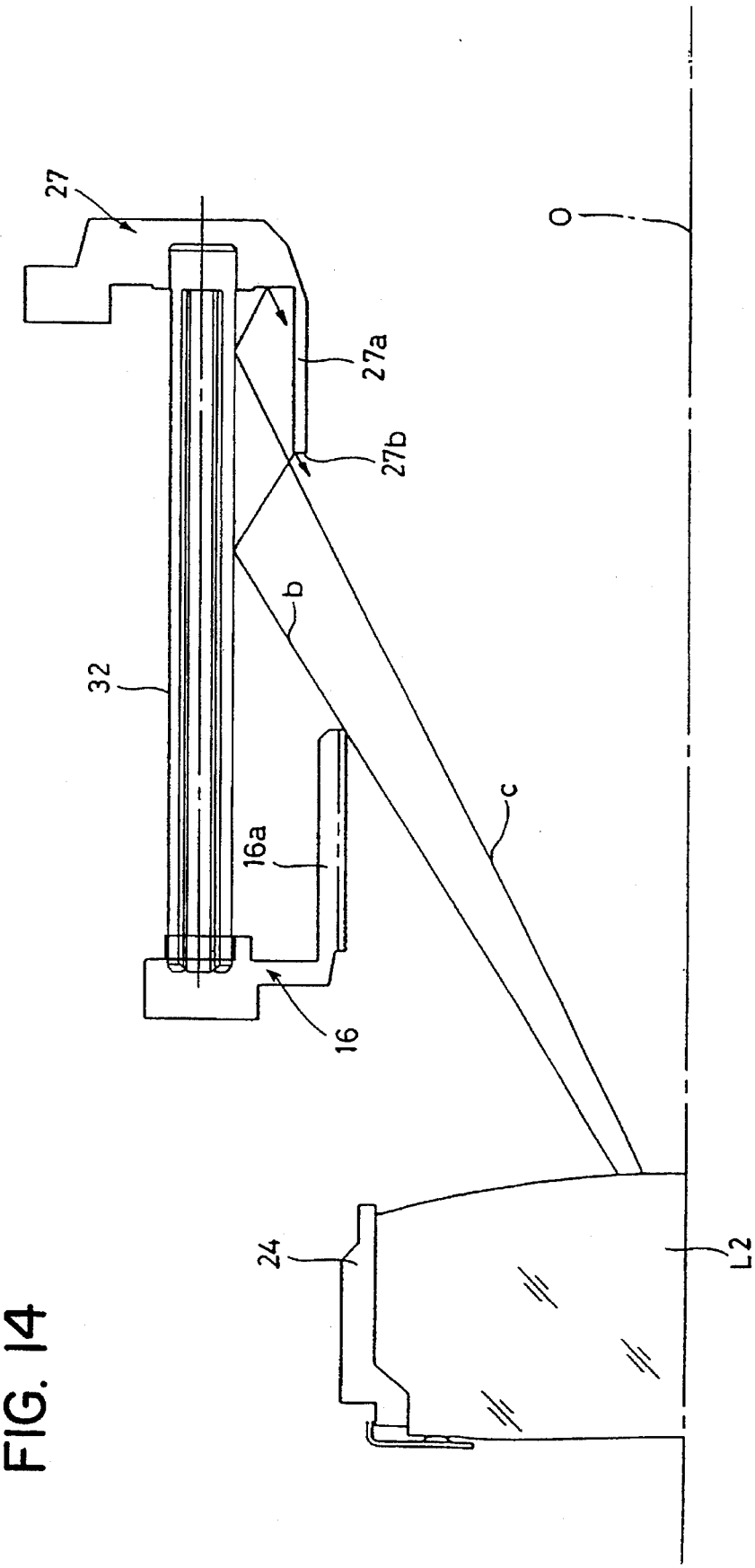

5,604,638

ANTI-REFLECTION STRUCTURE FOR ZOOM LENS BARREL

BACKGROUND OF THE INVENTION

1. Field of the Invention

The present invention relates to an anti-reflection structure for a zoom lens barrel.

2. Description of the Related Art

A lens barrel of a zoom camera is often provided with various types of rotational cylinders to carry out zooming or focusing operation. In order to reduce harmful internal reflection on the inner surface of a rotational cylinder, there has been proposed the provision of an anti-internal-reflection structure, in which a matte or rough surface is formed, on the inner cam channels of the rotational cylinder.

In a lens barrel that the applicant has been developing, a shaft for transmitting rotation between two different members is provided inside the rotational cylinder employing the above-noted anti-reflection structure, and a pinion is slidably fitted on the shaft. With this construction, however, it has been ascertained that the surface of the rotation transmitting shaft might cause a harmful internal reflection inside the rotational cylinder.

SUMMARY OF THE INVENTION

The present invention has been accomplished to eliminate the above drawbacks and the object thereof is to provide an anti-reflection structure for a zoom lens barrel to prevent harmful internal reflection caused by the surface of the shaft for transmitting rotation.

Two types of anti-reflection structures are provided in accordance with the present invention.

In the first anti-reflection structure, a contact guide portion is provided on a rotation transmitting shaft for allowing a pinion gear to slidably move thereon; a non-contact portion which does not contact the pinion gear, is formed on the overall surface of the shaft, excluding the contact portion; and an anti-reflection structure is formed on the non-contact portion. The anti-reflection structure may include a fine uneven or rough surface as well as a coated matte surface. With the above-mentioned construction, the portion with the anti-reflection structure does not contact the pinion gear, which prevents the coating from peeling off or the uneven surface from wearing. As a result, a harmful internal reflection is prevented for a long period of time. When the contact guide portion is formed as inclined side surfaces of a tapered straight key groove formed on the surface of the rotation transmitting shaft in the longitudinal direction thereof, that is, a direction parallel to the optical axis, there is little influence of the internal reflection by the contact guide portions.

In the second anti-reflection structure, the light reflected on the surface of the rotation transmitting shaft is interrupted by a light interrupting member so as not to enter the photographing optical system. The light interrupting member may be comprised of two light interrupting plates extending from two linearly movable cylinders, respectively. The distance between the two light interrupting plates changes during a zooming operation. However, it is not required that the two plates always overlap each other and it is acceptable that the tips of the two plates are separate from each other in the direction of the optical axis when they are farthest apart from each other.

Further, it is possible to provide a third anti-reflection structure by combining the two constructions described above.

According to one aspect of the present invention, there is provided an anti-reflection structure for a zoom lens barrel that includes a rotation cylinder linearly movable in a direction of an optical axis while rotating. A shaft is located in the rotation cylinder and rotated by a drive source, and pinion is fitted on the shaft in a slidable manner in an axial direction thereof so as to move in a direction parallel to the optical axis together with the rotation cylinder, the pinion transmitting the rotation of the shaft to the rotation cylinder. A contact guide portion is formed on the shaft for allowing the pinion to slidably move on the contact guide portion, a non-contact portion which does not contact the pinion, is formed on the shaft and an anti-reflection structure is formed on the non-contact portion for preventing light from being reflected on the non-contact portion.

According to another aspect of the present invention, there is provided an anti-reflection structure for a zoom lens barrel that includes a first cylinder guided in a an optical axis direction and second cylinder fitted in the first cylinder such that the second cylinder moves with respect to the first cylinder in the optical axis direction when rotated about the optical axis with respect to the first cylinder. A member is positioned in the second cylinder and moves together with the second cylinder in the optical axis direction without rotating with respect to the first cylinder, and a shaft is positioned inside the first cylinder and extends in a direction parallel to the optical axis, such that one end of the shaft is supported on the first cylinder. A pinion is supported on the member and fitted on the shaft in a slidable manner in the axial direction, and a non-contact surface is formed on the shaft and extends along the shaft, the non-contact surface not coming into contact with the pinion, wherein the non-contact surface is matted so that light may not reflect on the non-contact surface.

According to yet another aspect of the present invention, there is provided an anti-reflection structure for a zoom lens barrel that includes a first rotation cylinder; a movable cylinder linearly moving in a direction of an optical axis by the rotation of the first rotation cylinder; a second rotation cylinder rotatably engaging the movable cylinder and moving in the optical axis direction with respect to the movable cylinder when rotated; front and rear lens groups moving in the optical axis direction along a predetermined path by the rotation of the second rotation cylinder to thereby change a focal length; a first pinion rotatably supported on the movable cylinder; a second pinion rotatably supported on the second rotation cylinder; and a shaft for transmitting the rotation of one of the first and second pinions to the other. The second pinion fits on the shaft such that the second pinion is slidable on the shaft in an axial direction of the shaft. An anti-reflection portion is formed on each of the movable cylinder and the second rotation cylinder for preventing harmful internal reflection from occurring inside the zoom lens barrel, which is caused by the shaft.

According to yet another aspect of the present invention, there is provided an anti-reflection structure for a zoom lens barrel that includes a rotation transmitting shaft placed in the zoom lens barrel and rotated by a drive source; a pinion fitted on the rotation transmitting shaft in a slidable manner in an axial direction thereof so as to move in a direction parallel to an optical axis of a zoom lens; a contact guide portion formed on the rotation transmitting shaft for allowing the pinion to slidably move on the contact guide portion; a non-contact portion formed on the rotation transmitting shaft which does not contact the pinion; and an anti-reflection structure formed on the non-contact portion for preventing light from being reflected on the non-contact portion.

According to yet another aspect of the present invention, there is provided an anti-reflection structure that includes a rotation transmitting shaft placed in the zoom lens barrel and rotated by a drive source, the rotation transmitting shaft having a non-circular cross section; a pinion provided with a non-circular hole in which the rotation transmitting shaft is fitted in a slidable manner in an axial direction thereof so as to move on the shaft in a direction parallel to an optical axis of a zoom lens and rotate together with the shaft; a contact guide portion formed on the rotation transmitting shaft for allowing the pinion to slidably move on the contact guide portion; a non-contact portion formed on the rotation transmitting shaft which does not contact the pinion; and an anti-reflection structure formed on the non-contact portion for preventing light from being reflected on the non-contact portion.

According to yet another aspect of the present invention, there is provided an anti-reflection structure that includes a movable cylinder linearly moving in an optical; axis direction a movable member linearly moving in a direction of an optical axis with respect to the movable cylinder; a first pinion rotatably supported on the movable cylinder; a second pinion rotatably supported on the movable member; and a shaft for transmitting the rotation of one of the first and second pinions to the other. The second pinion fits on the shaft such that the second pinion is slidable on the shaft in an axial direction of the shaft. An anti-reflection portion is formed on each of the movable cylinder and the movable member for preventing harmful internal reflection caused by the rotation transmitting shaft, with each anti-reflection portion extending over and along the rotation transmitting shaft.

The present disclosure relates to subject matter contained in Japanese utility model applications No.5-64451 (filed on Dec. 1, 1993) and No.5-65077 (filed on Dec. 6, 1993) which are expressly incorporated herein by reference in their entireties.

BRIEF DESCRIPTION OF THE DRAWINGS

The present invention will be more apparent from the following description with reference to the accompanying drawings.

DETAILED DESCRIPTION OF PREFERRED EMBODIMENTS

In this embodiment, the zoom lens barrel block includes a front lens group L1 and a rear lens group L2, and the focusing operation is carried out by the movement of the front lens group L1 as it travels in the optical axis direction O of the lens system.

Figure 7:
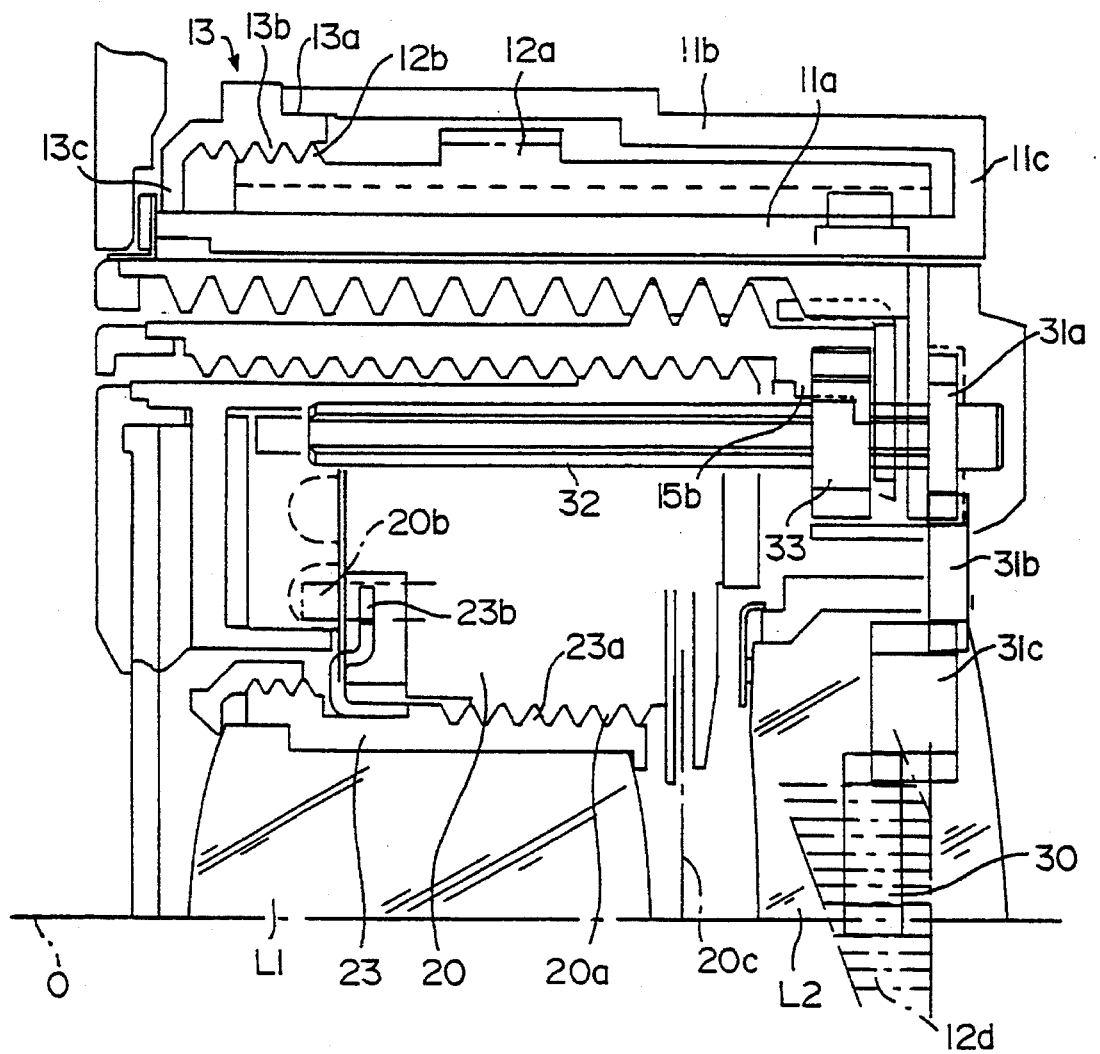
FIG. 7 is a lateral cross-sectional view of the upper half of the accommodated zoom lens barrel block according to the present invention.
Figure 8:
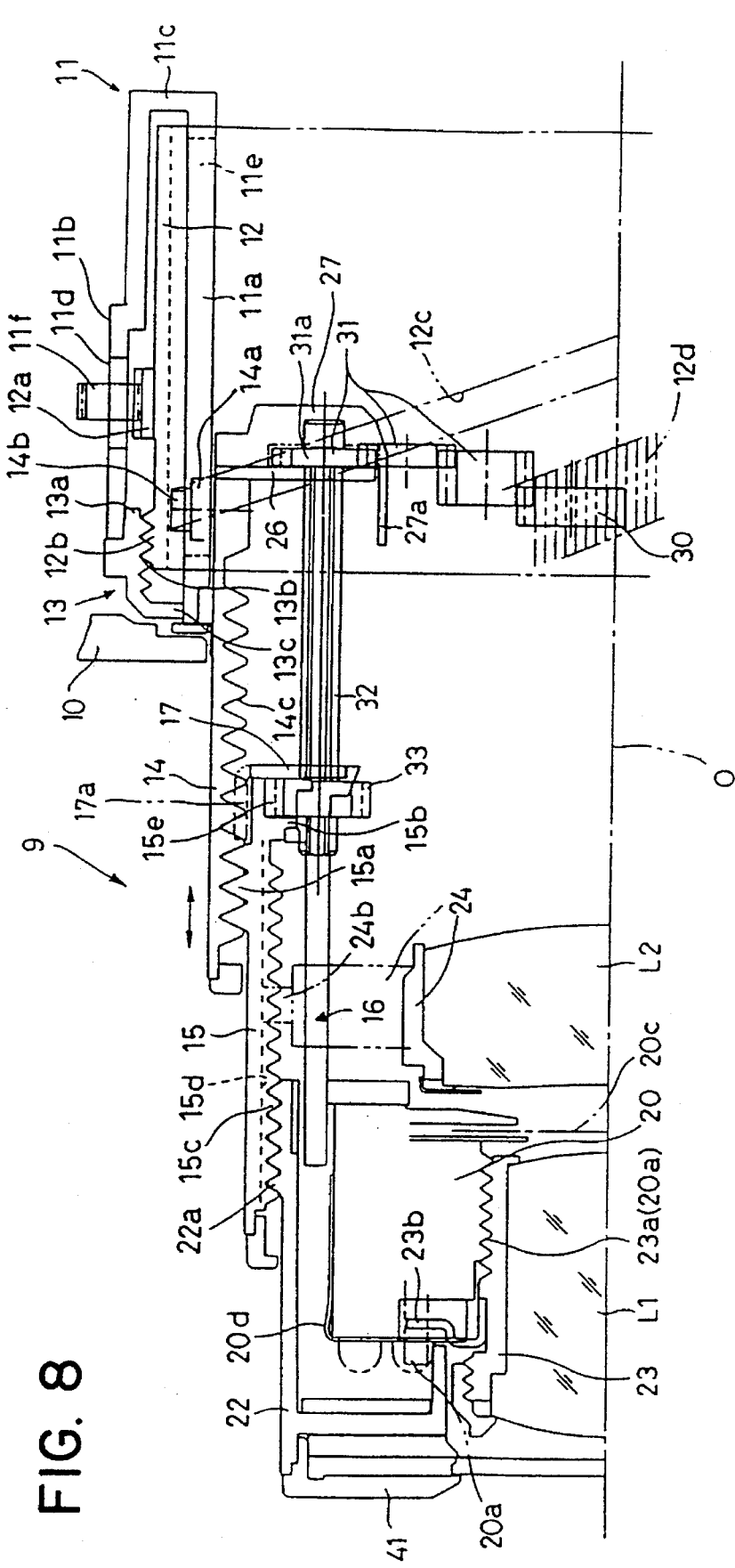
FIG. 8 is a lateral cross-sectional view of the upper half of the extended zoom lens barrel block according to the present invention.

As illustrated in FIGS. 7 and 8, a fixed lens barrel 11 is integrally formed with a camera body 10. The fixed lens barrel 11 includes an inner cylinder 11a and an outer cylinder 11b. The inner and outer cylinders 11a and 11b are connected to each other through a connecting wall 11c, and the front ends of the cylinders 11a and 11b are open. A rotation cylinder (i.e., first rotational cylinder) 12, which is inserted from the open end of the cylinders 11a and 11b, is rotatably mounted on the outer periphery of the inner cylinder 11a. Three straight grooves 11e each extending in a direction parallel to the optical axis O are formed on the inner cylinder 11a. Only one of the three straight guide grooves 11e is shown in FIG. 8.

Figure 2:
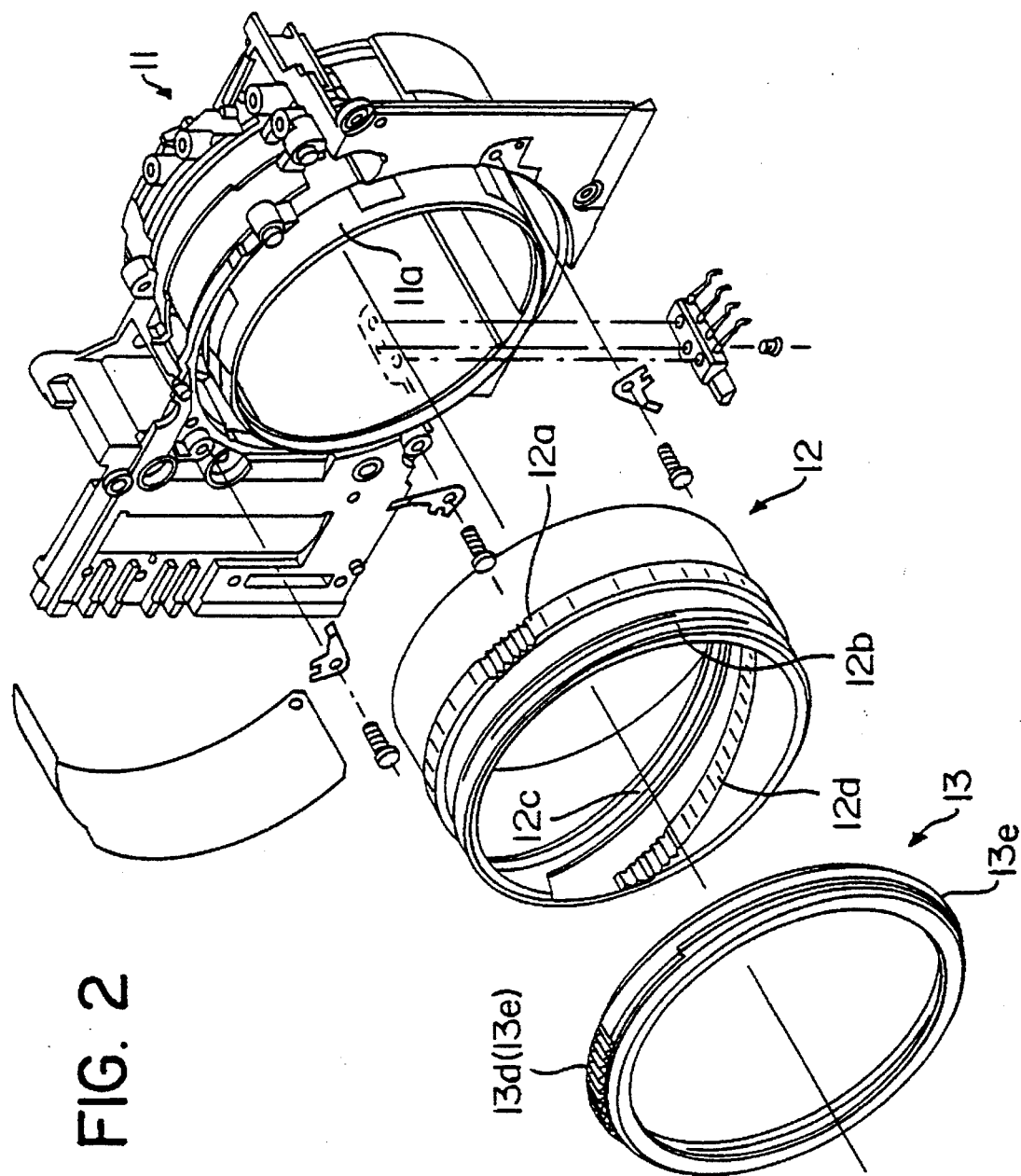
FIG. 2 is an enlarged isometric view of the rear portion of the zoom lens barrel block shown in FIG. 1.

A spur gear 12a is integrally formed with the rotation cylinder 12 on an outer periphery thereof, and a fine thread 12b is integrally formed with the rotation cylinder 12 at the tip of the outer peripheral portion thereof. On the inner wall of the rotation cylinder 12 are formed three lead grooves 12c parallel to one another and each inclined to the circumferential direction of the cylinder 12, and an inclined inner gear 12d parallel to the lead grooves 12c. Only one of the lead grooves 12c is shown in FIGS. 2 and 8.

A support ring 13 is secured to the front open end of the inner cylinder 11a and outer cylinder 11b of the fixed lens barrel 11. The support ring 13 includes a portion 13a engaging the inner surface of the outer cylinder 11b; a threaded portion 13b engaging the fine thread 12b; a portion 13c contacting an outer surface of the inner cylinder 11a; and an outer flange 13e. The support ring 13 is biased against the fixed lens barrel 11 by a spring means (not shown) and is sustained (i.e., retained) at a predetermined position. Reference symbol 13d is a gear formed on an outer periphery of the support ring 13 for adjustment of a position of the rotation cylinder 12 in the direction of the optical axis O. The support ring 13 also functions to strengthen the edge of the inner cylinder 11a and the outer cylinder 11b.

A notch 11d for allowing the pinion 11f to mesh with the spur gear 12a is provided with the outer cylinder 11b of the fixed lens barrel 11, and other notches similar to the notch 11*d* are formed on the inner cylinder 11*a* to expose the lead grooves 12*c* and the inclined inner gear 12*d*.

Figure 12:
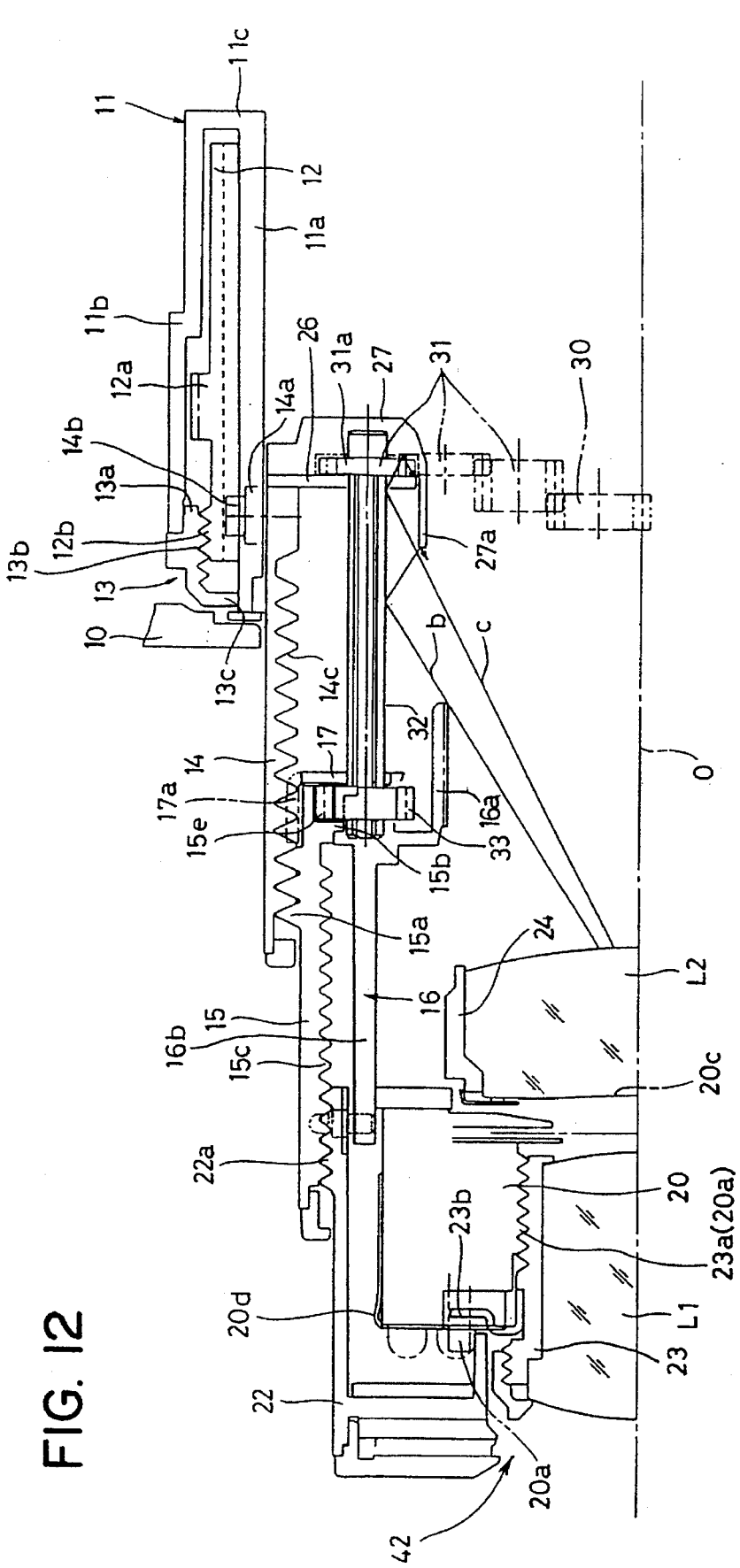
FIG. 12 is a lateral cross-sectional view of the upper half of the zoom lens barrel block shown in FIG. 11 in a fully extended state.
Figure 13:
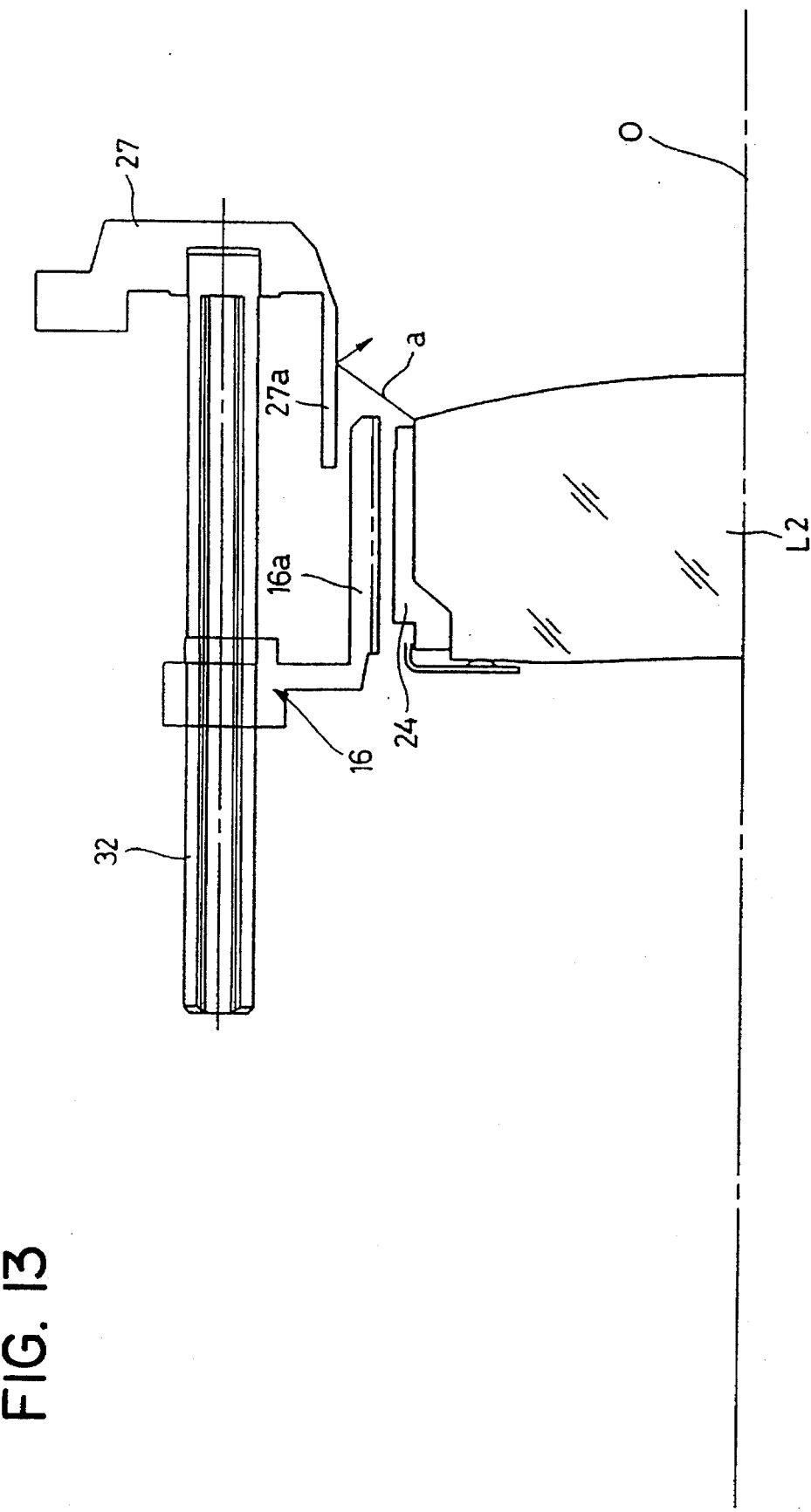
FIG. 13 is a lateral cross-sectional view of the anti-reflection structure in the middle of the zooming operation shown in FIG. 11; and, FIG. 14 is a lateral cross-sectional view of the anti-reflection structure in the fully extended state shown in FIG. 12.

A first cylinder (i.e., movable cylinder) 14 linearly moving in the direction of the optical axis O fits in the inner cylinder 11*a* of the fixed lens barrel 11. Three straight guide projections 14*a* are integrally formed with the outer periphery of the first cylinder 14 and engage the guide groove 11*e* of the fixed lens barrel 11. Only one of the three straight guide projections 14*a* is shown in FIGS. 8 and 12. A pin 14*b* engaging the corresponding lead groove 12*c* of the rotation cylinder 12 is formed on each of the guide projections 14*a*. A female hellcold 14*c* and three straight guide grooves (i.e., straight guides) 14*d* parallel to the optical axis O are formed on the inner wall of the first cylinder 14. Only one of the three straight guide grooves 14*d* can be seen in FIG. 3. With the construction described above, the rotation of the rotation cylinder 12 causes the first cylinder 14 to move in the direction of the optical axis O without rotating by means of the guide grooves 11*e* and the lead grooves 12*c*.

Inside the first cylinder 14 is accommodated a second cylinder (i.e., rotation cylinder or second rotation cylinder) 15, and at a rear portion of the outer periphery of the second cylinder 15 is formed a male helicoid 15*a* which engages the female helicoid 14*c* of the first cylinder 14. A straight guide member 16 is situated in the second cylinder 15, and a straight guide plate 17 is fixed by fastening screws 19 to a rear end portion of the guide member 16. An inner flange 15*b* is integrally formed with the second cylinder 15 between the guide member 16 and the guide plate 17 so as to rotate in relation to the guide member 16 and the guide plate 17. Three straight guide keys (i.e., engaging members) 17*a* are formed on the periphery of the guide plate 17 and engage the guide grooves 14*d* of the first cylinder 14. As a result, the guide member 16 and the guide plate 17 rotate in relation to the second cylinder 15 and integrally move in the direction of the optical axis O. In other words, the second cylinder 15 is rotatable and movable in the direction of the optical axis O at the same time by means of the male and female helicoids 15*a* and 14*c*. Also, the guide member 16 and the guide plate 17 are movable together with the second cylinder 15 in the direction of the optical axis O without rotating.

The guide member 16 is provided with three straight keys 16*b*, each extending in a direction parallel to the optical axis O. A guide member 18 for linearly guiding the front lens group L1 is provided with three straight keys 18*a* which engage the three straight keys 16*b*, and each extend in a direction parallel to the optical axis O. A shutter block 20 is secured to the front lens group guide member 18 through fastening screws 21 and is further secured to the front lens group supporting cylinder 22. As a result, the shutter block 20 and the front lens group supporting cylinder 22 are prevented from rotating and are allowed to move only in the direction parallel to the optical axis.

Figure 1:
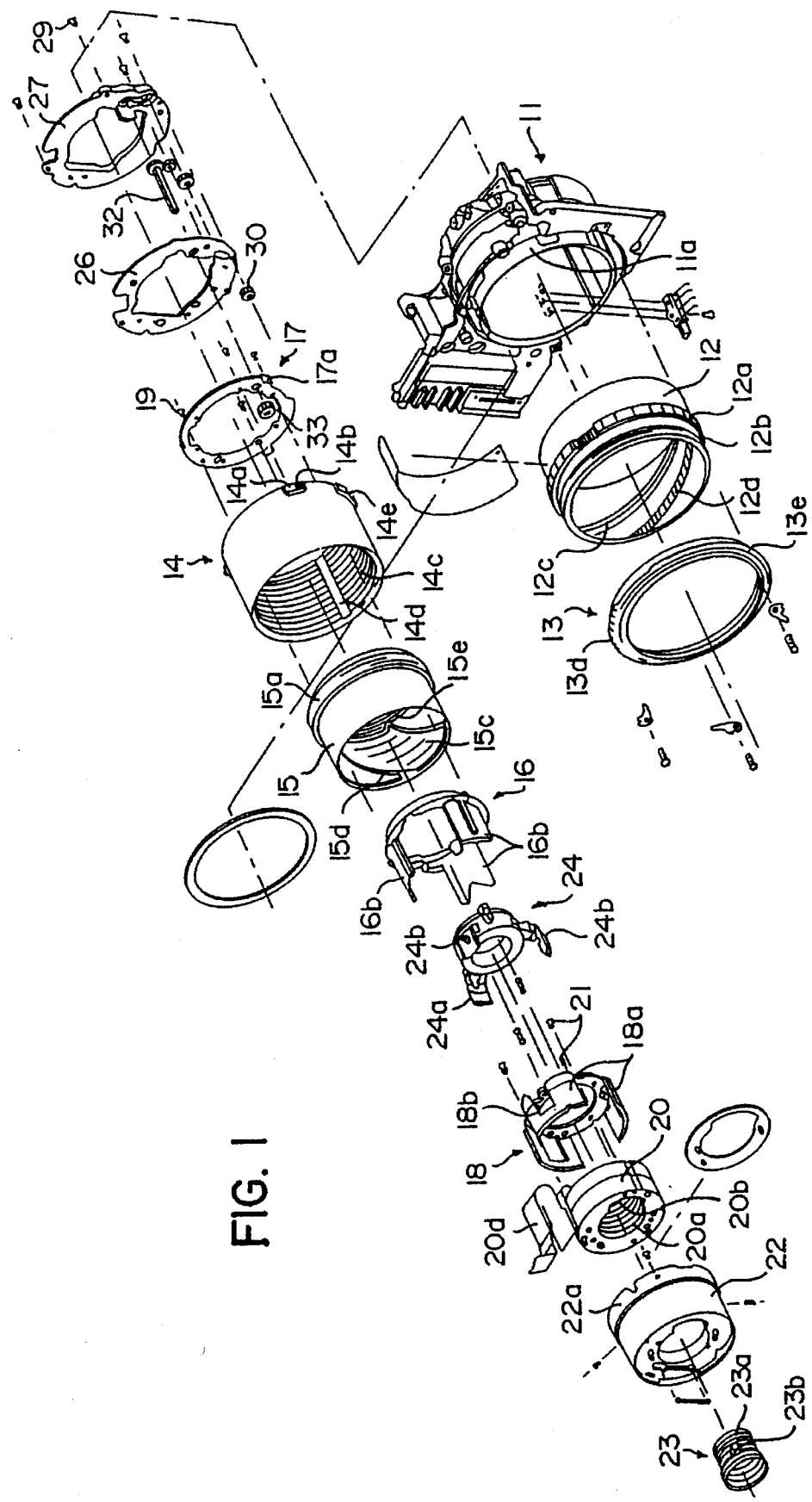
FIG. 1 is an exploded isometric view of a zoom lens barrel block according to an embodiment of the present invention.
Figure 4:
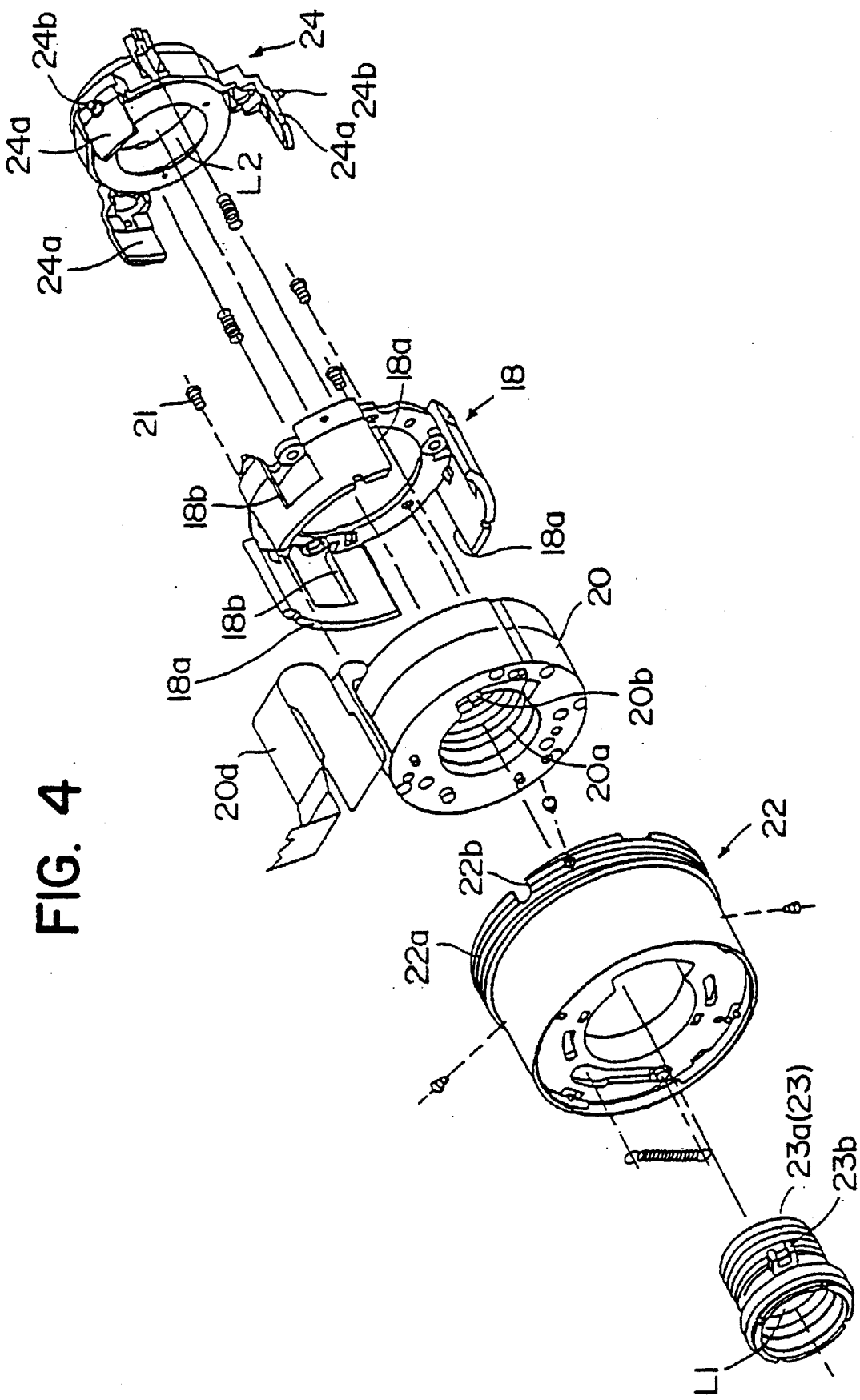
FIG. 4 is an enlarged isometric view of the front portion of the zoom lens barrel block shown in FIG. 1.
Figure 5:
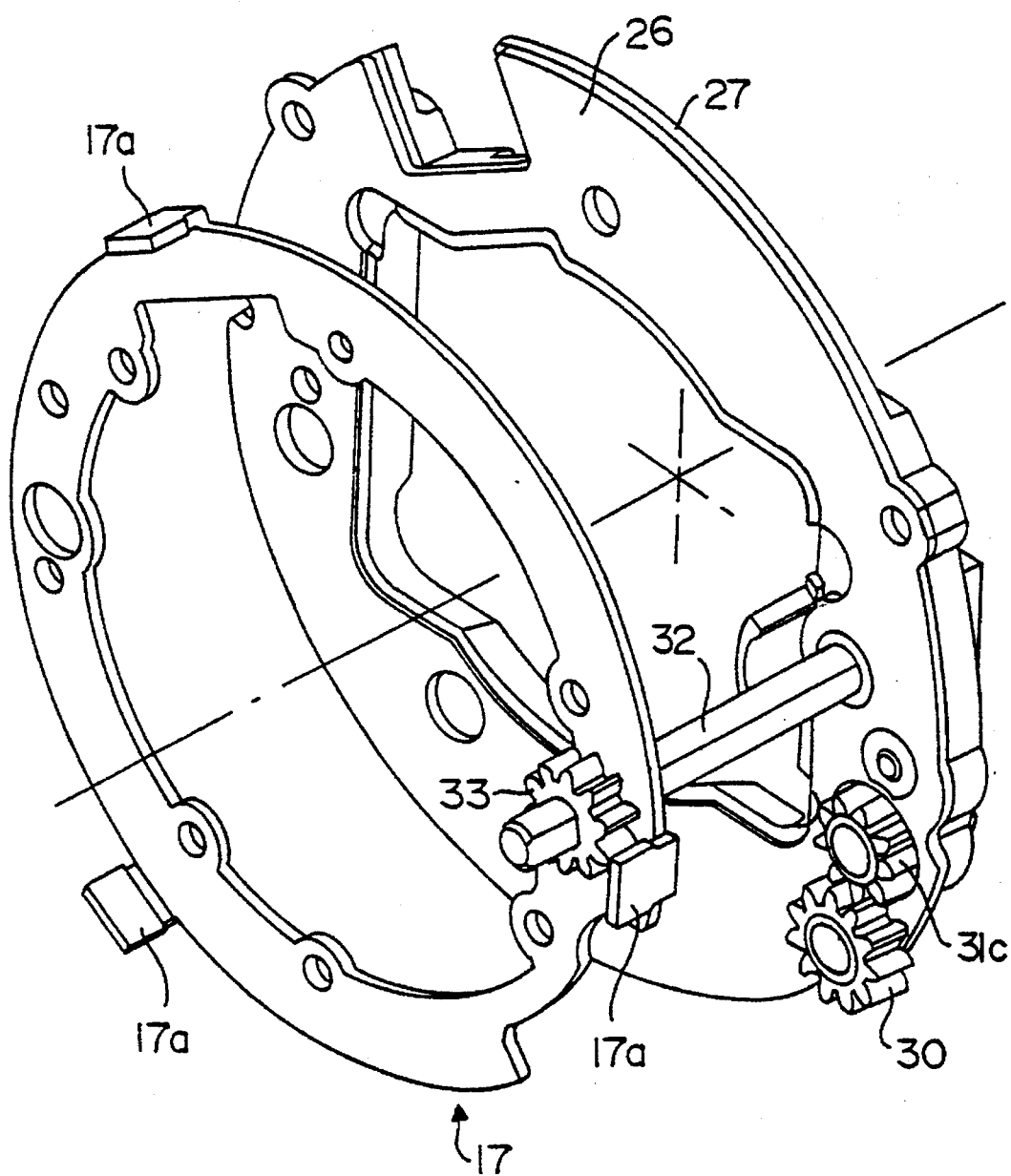
FIG. 5 is an isometric view of a supporting mechanism for a driving system of the zoom lens barrel block shown in FIG. 1.
Figure 6:
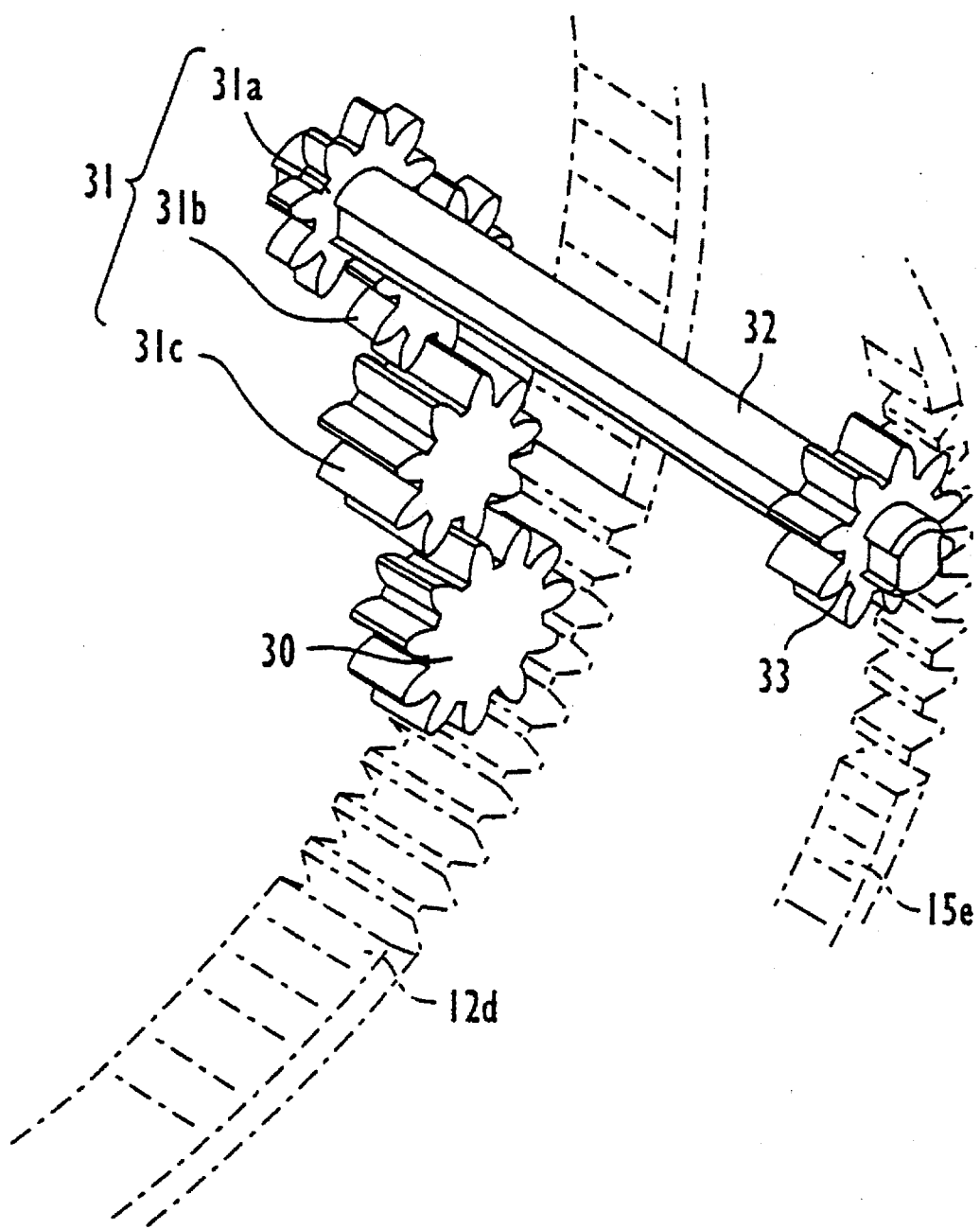
FIG. 6 is an isometric view of gears of the driving system.

As illustrated in FIGS. 1 and 4, the shutter block 20 is provided on its inner periphery with a female helicoid 20*a* extending parallel to the optical axis O, and a male hellcold 23*a* of a front lens supporting ring 23, to which the front lens group L1 is fixed, which is engaged with the female helicoid 20*a*. At the rear end portion of the outer periphery of the front lens group supporting cylinder 22, a male helicoid 22*a* is formed (FIG. 8) to move the front lens supporting ring 23 in the direction of the optical axis O in a zooming operation. The shutter block 20 is provided with shutter blades 20*c*, and driving signals are supplied to the shutter block 20 through a flexible printed circuit board 20*d*.

A rear lens group guiding slot 18*b* is formed on each of the straight keys 18*a* of the front lens group guide member 18 for linearly moving the rear lens group L2 in the direction of the optical axis O. The rear lens group L2 is secured to the rear lens frame 24. Three straight keys 24*a* engaging the rear lens group guiding slots 18*b* are formed on the rear lens frame 24. A cam pin 24*b* is formed on each of the keys 24*a* so as to project in a radial direction therefrom.

A female hellcold 15*c* and three cam grooves 15*d* are formed on the inner periphery of the second cylinder 15. The female hellcold 15*c* engages a male helicoid 22*a* of the front lens group supporting cylinder 22, and the cam grooves 15*d* engage the cam pins 24*b* of the rear lens frame 24. The cam grooves 15*d* meet with the female helicoid 15*c* at the same position in the circumferential direction of the second cylinder 15 such that a part of the female helicoid 15*c* is removed. When assembled, the cam pins 24*b* of the rear lens frame 24 are engaged with open grooves 22*b* of the front lens group supporting cylinder 22, and under this condition, the cam pins 24*b* are engaged with the cam grooves 15*d* and the male helicoid 22*a* is engaged with the female helicoid 15*c*. Under these conditions, the rotation of the second cylinder 15 causes the front lens group supporting cylinder 22 (front lens group L1) to linearly move in the optical axis direction O due to the relationships between the female helicoid 15*c* and the male helicoid 22*a*, and between the keys 16*b* of the guide member 16 and the keys 18*a* of the front lens element guide member 18. Further, the rotation of the second cylinder 15 causes the rear lens frame 24 (rear lens group L2) to move along a predetermined path in the optical axis direction O due to the relationships between the cam grooves 15*d* and the cam pins 24*b*, and between the keys 24*a* of the rear lens frame 24 and the rear lens group guiding slots 18*b* of the front lens guide member 18 to thereby effect zooming.

As explained above, when the rotational ring 12 is driven, the first cylinder 14 linearly moves in the optical axis direction O, and when the second cylinder 15 is rotated in relation to the first cylinder 14 the second cylinder 15 moves in the optical axis direction O while rotating. As a result, the front lens group L1 and the rear lens group L2 linearly move while the distance between the two lens groups changes to thereby effect zooming.

Figure 3:
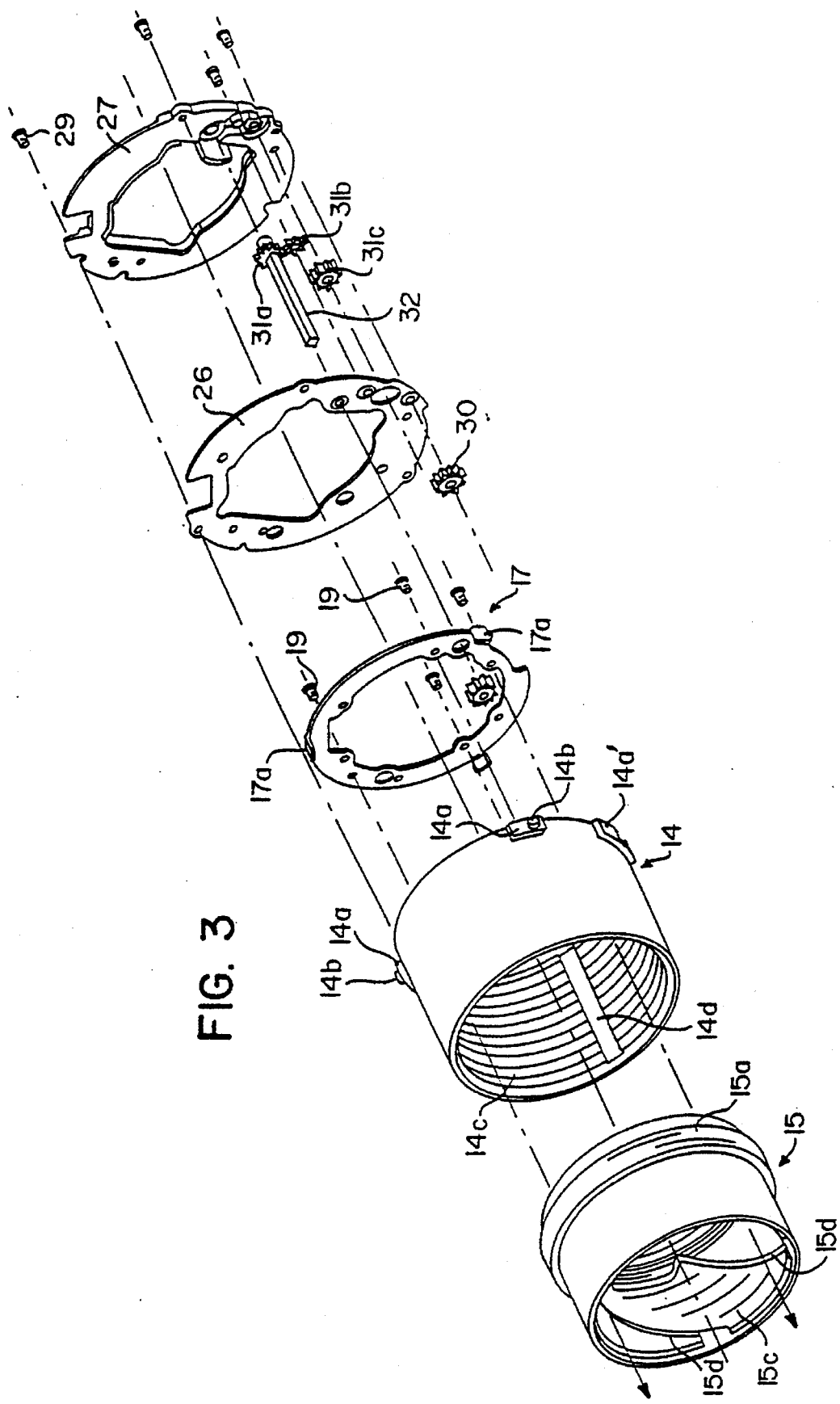
FIG. 3 is an enlarged isometric view of the intermediate portion of the zoom lens barrel block shown in FIG. 1.

Next, a driving mechanism for rotating the second cylinder 15 will be explained. The driving mechanism transmits the rotation of the rotation cylinder 12 to the second cylinder 15. A pair of gear supporting plates 26 and 27 are fixed to the rear end of the first cylinder 14 through fastening screws 29. A pinion 30 engaging the inclined inner gear 12*d* of the rotation cylinder 12 is rotatably attached to the gear supporting plate 26. Between two of the three straight keys 14*a* formed on the rear end portion of the first cylinder 14 in the circumferential direction is formed a straight guide projection 14*a*' having a space 14*e* for accommodating a pinion 30 as illustrated in FIG. 3. A part of the teeth of the pinion 30 accommodated in the space 14*e* projects from the outer periphery of the first cylinder 14. The inclined inner gear 12*d* of the rotation cylinder 12 is parallel to the lead groove 12*c* as indicated in FIG. 2, so that the engagement between the pinion 30 and the inclined inner gear 12*d* is maintained even when the first cylinder 14 moves in the optical axis direction O due to the rotation of the cylinder 12. A gear train 31 receiving the rotation of the pinion 30 is supported between the gear supporting plates 26 and 27, and a rotation transmitting shaft 32 which extends forwardly along the optical axis O is integrally formed with a final gear 31*a*. The shaft 32 has a uniform cross section which is not round.

A pinion 33 is supported on the guide plate 17 fixed to the rear end face of the guide member 16. The pinion 33 slidably fits on the shaft 32 such that the pinion 33 is movable on the shaft 32 in the axial direction thereof but not rotatable with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second cylinder 15) in the optical axis direction O. The pinion 33 meshes with a circumferential inner gear 15e which is formed on the inner surface of the second cylinder 15. Therefore, the rotation of the rotation cylinder 12 is transmitted to the second cylinder 15 through the inclined inner gear 12d, the pinion 30, the gear train 31, the rotation transmitting shaft 32, the pinion 33 and the circumferential inner gear 15e, regardless of the position of the first cylinder 14, in the direction of the optical axis O.

In the zoom lens barrel with the above-mentioned construction according to the present invention, when the rotation cylinder 12 is rotated in a forward or reverse direction, the first cylinder 14 linearly moves in the optical axis direction O and the second cylinder 15 rotates. The rotation of the second cylinder 15 allows the second cylinder 15 to move in the optical axis direction O, and the front lens group L1 and the rear lens group L2 linearly move while changing the distance between the two lens groups to thereby effect zooming. As described above, the front lens group L1 and the rear lens group L2 are movable between the retracted state of the zoom lens barrel 9 shown in FIG. 7 and the fully extended position shown in FIG.8. Moreover, in the retracted state, the first cylinder 14, the second cylinder 15 and the front lens group supporting cylinder 22 do not project from the outer periphery of the main body (camera body 10), resulting in short extension distance. Reference numeral 41 in FIGS.7 and 8 shows a decorative plate.

Figure 9:
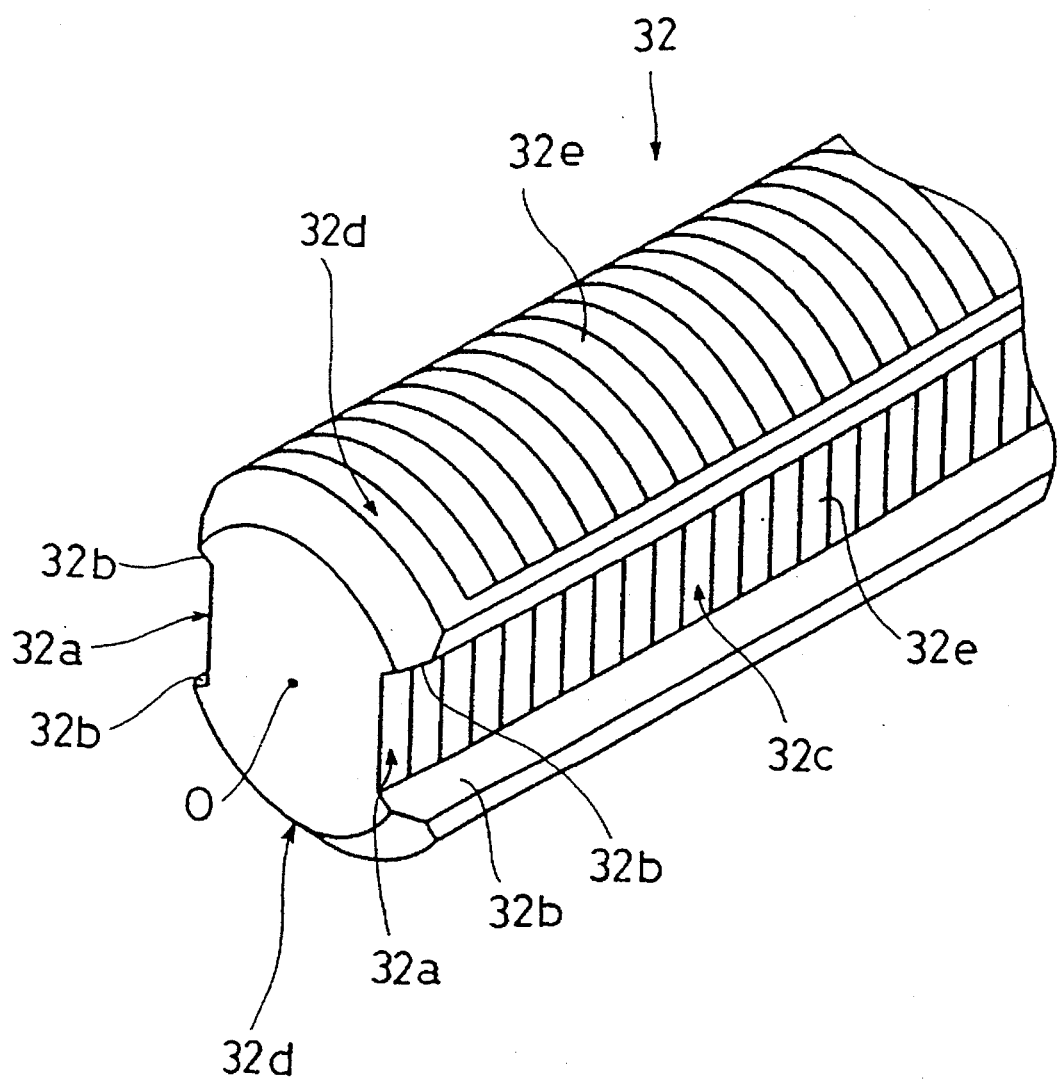
FIG. 9 is an enlarged perspective view of a rotation transmitting shaft according to an embodiment of the present invention.

Next, an anti-reflection structure for a zoom lens barrel according to the first embodiment of the present invention will be explained. FIG. 9 is an enlarged isometric view of the rotation transmitting shaft 32. The rotation transmitting shaft 32 is provided thereon with tapered key grooves 32a symmetrically formed with respect to the center axis O of the shaft 32 and each tapered toward the center axis O. Inclined side surfaces 32b slidably contact the pinion 33. The bottom surfaces 32c of the key grooves 32a and curved surfaces 32d of the shaft 32 do not contact the pinion 33 when the pinion 33 slidably moves on the rotation transmitting shaft 32. The bottom surfaces 32c and curved surfaces 32d are referred to as non-contact surfaces. The bottom surfaces 32c and the curved surfaces 32d as non-contact surfaces are formed as matte or rough surfaces. More precisely, the bottom surfaces 32c and the arc surfaces 32d are provided thereon with a plurality of matt or rough surface portions 32e (i.e., anti-reflecting means) aligned side by side in the axial direction of the shaft 32. As shown in FIG. 9, the plurality of matte surface portions 32e can be seen as stripes formed on the surfaces 32c and 32d.

Figure 10:
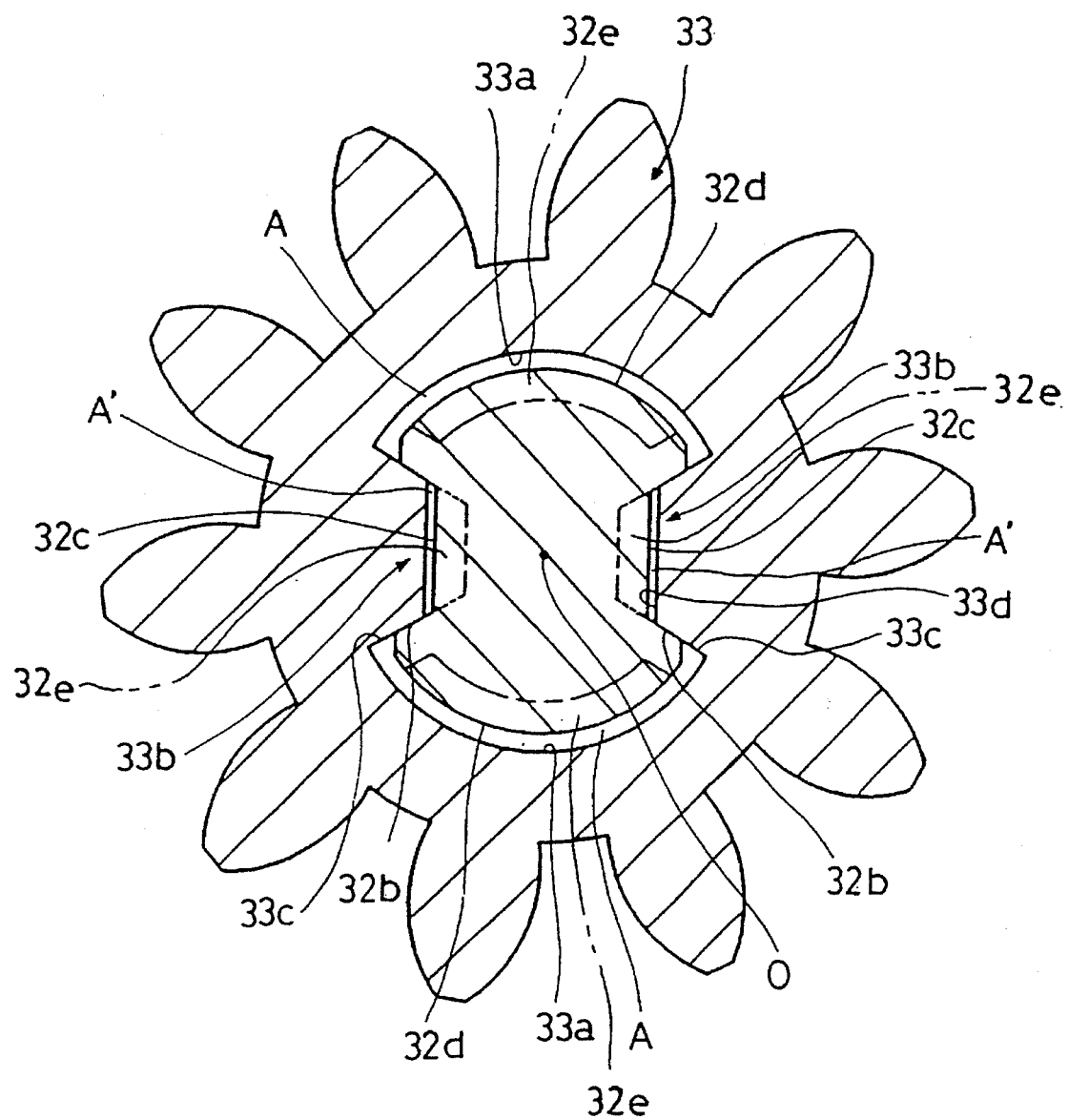
FIG. 10 is a cross-sectional view of the rotation transmitting shaft and a pinion according to the present invention.
Figure 11:
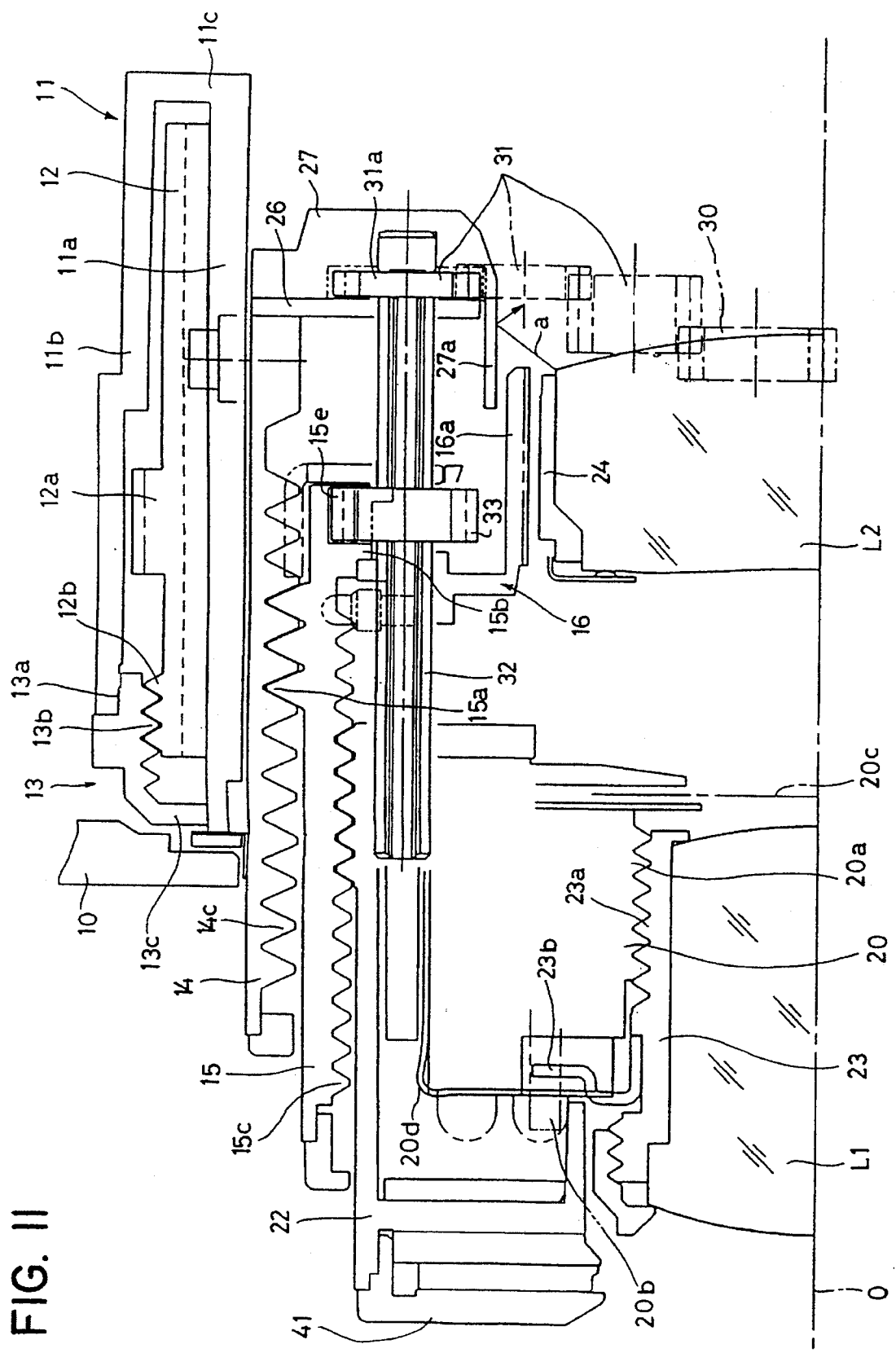
FIG. 11 is a lateral cross-sectional view of the upper half of the zoom lens barrel block in the middle of a zooming operation; and according to the present invention.

The pinion 33 is provided with a through hole to which the shaft 32 is inserted (FIG. 10). The hole of the pinion 33 is formed by tapered projections 33b and curved members 33a. The tapered projections 33b project toward each other and each are tapered toward the center of the through hole of the pinion 33, i.e, the center axis O of the shaft 32. The tapered projections 33b are slidable in the tapered straight key grooves 32a. The curved members 33a face the curved surfaces 32d of the shaft 32 and are formed so as to be concentric with the curved surfaces 32d with respect to the center axis O of the rotation transmitting shaft 32. The diameter of the curved members 33a is larger than that of the shaft 32 so that a space A is formed between them to create non-contact surfaces.

The straight key grooves 32a of the rotation transmitting shaft 32 are each formed to have a tapered cross section similar to that of the projections 33b to accommodate a predetermined depth of the projections 33b of the pinion 33, and the side surfaces 32b and 33c are inclined with the same angles. With the above-mentioned construction, the movement of the inclined side surfaces 32b with respect to the projections 33b in a radial direction of the shaft 32 is restricted, so that the shaft 32 does not move in the right or left direction of FIG. 10 in the hole of the pinion 33, resulting in a stable positioning of the shaft 32. As a result, a space A' is formed between the bottoms 32c of the straight key grooves 32a and tops 33d of the projections 33b to create non-contact surfaces. To maintain the spaces A and A' in the axial direction of the shaft 32, the bottoms 32c and the tops 33d are preferably formed to be parallel to each other. It is preferable that the curved surfaces 32d and the curved members 33a are concentric with respect to the center axis O of the shaft 32 so as to maintain a non-contact state.

With the above-mentioned construction, the pinion 33 slidably moves only on the contact surface of the rotation transmitting shaft 32 in zooming and focusing operations. As a result, the matte surface portions 32e formed on non-contact surfaces of the rotation transmitting shaft 32 are not peeled off or worn, thereby the anti-reflection effect of the shaft 32 is maintained.

In this embodiment, the anti-reflection structure according to the present invention is applied to the driving mechanism for rotating the second cylinder 15. The present invention may also be applied to any other rotation transmitting shaft on which a rotational member is fitted in a slidable manner. The anti-reflecting mechanism of the rotation transmitting shaft 32 may be in any other form or shape than those in the above embodiment. For instance, the surfaces 32c and 32d may be coated or painted with a certain material or paint to form the surfaces 32c and 32d as matte or rough surfaces.

Next, an anti-reflection structure for a zoom lens barrel according to the second embodiment of the present invention will be explained. This anti-reflection structure solves a problem that the surface of the rotation transmitting shaft 32 placed in the photographing optical path causes harmful internal reflection inside the lens barrel, which interferes with the exposed image on photographic film. As illustrated in FIGS. 11 to 14, the straight guide member 16 which rotatably supports the pinion 33 and moves in the direction of the optical axis O, that is, along the rotation transmitting shaft 32, together with the second cylinder 15, and the gear supporting plate 27 for rotatably supporting the final gear 31a together with the first cylinder 14 are provided with a pair of light interrupting plates 16a and 27a which project from the inner wall of the straight guide member 16 and the gear supporting plate 27 and extend in a direction parallel to the optical axis O so as to approach to each other, respectively. The light interrupting plates 16a and 27a constitute an anti-reflection structure and each have a curve-shaped cross section. The inner and outer surfaces of the light interrupting plates 16a and 27a, that is, the surfaces opposing the rear lens group L2 and the rotation transmitting shaft 32 are provided with anti-reflection measures such as matte or rough surfaces to provide a matte surface similar to that of the first embodiment so as to prevent harmful internal reflection.

The light interrupting plate 27a is mounted further away from the optical axis O in comparison with the light interrupting plate 16a. Thus the plates 27a and 16a overlap each other when approaching each other during the zooming operation shown in FIGS. 11 and 13. Light "a" which enters from a lens opening 42 and emits from the rear lens group L2 enters the inner surface of the light interrupting plate 27a, but does not reach the rotation transmitting shaft 32, which solves the problem that the surface of the rotation transmitting shaft 32 causes harmful internal reflection and adversely affects the photographic film. When the front and rear lens group L1 and L2 are separate from each other at the fully extended state shown in FIGS. 12 and 14, lights "b" and "c" which enter from the lens opening 42 and emit from the rear lens group L2 are reflected by the surface of the rotation transmitting shaft 32. But the light is further reflected by the outer surface and edges of the light interrupting plate 27, which prevents harmful internal reflection caused by the rotation transmitting shaft 32.

It is not required that the extension of the light interrupting plates 16a and 27a covers the total length of the rotation transmitting shaft 32 in the axial direction thereof, and it is sufficient if light reflected by the rotation transmitting shaft 32 in the above mentioned fully extended state is further reflected in the forward direction of the optical axis O. Therefore, a necessary minimum length is required to form the light interrupting plates 16a and 27a on the straight guide member 16 and the gear supporting plate 27, respectively, to prevent harmful internal reflection caused by the rotation transmitting shaft 32. As a result, an anti-reflection structure with a simple construction can be obtained, contributing to the performance of a compact zoom lens barrel.

It is possible to provide a further improved anti-reflection structure by combining the above-mentioned light interrupting member, contact guide portion and non-contact portion formed on the rotation transmitting shaft, and matte surface portions formed on the non-contact portion.

As described above, with the construction of the anti-reflection structure according to the present invention, the occurrence of harmful internal reflection caused by peeling off or wearing of the surface of the rotation transmitting shaft due to the slide of the gear thereon is prevented. Further, when matte surface portions are formed on the non-contact portion to prevent harmful internal reflection, anti-reflection effect of the rotation transmitting shaft is not deteriorated even if the gear slides on the shaft.

An anti-reflection portion for preventing harmful internal reflection caused by the rotation transmitting shaft is formed on each of the first and second cylinders. Thereby, harmful internal reflection caused by the rotation transmitting shaft in the zoom lens barrel is prevented.

When the first cylinder is provided with a gear supporting plate for supporting one of the pair of gears in combination with the first cylinder, and the second cylinder is provided with a straight guide member for supporting the other gear of the pair of gears together with the second cylinder, it is possible to form the anti-reflection portion as a pair of light interrupting plates which project from the gear supporting plate and the straight guide member and extend in a direction parallel to the optical axis so as to approach to each other. In such a case, the extended portions of the light interrupting plates are enough to have the necessary minimum length, which provides a simple anti-reflection structure, contributing to the performance of a compact zoom lens barrel.

It is possible to provide a further improved anti-reflection structure by combining the above mentioned light interrupting member, contact guide portion and non-contact portion formed on the rotation transmitting shaft, and an anti-reflection mechanism such as a fine uneven matte surface formed on the non-contact portion.

We claim:

1. An anti-reflection structure for a zoom lens barrel, comprising:

a rotation cylinder linearly movable in a direction of an optical axis while rotating;

a shaft placed in said rotation cylinder and rotated by a drive source;

a pinion fitted on said shaft in a slidable manner in an axial direction thereof so as to move in a direction parallel to said optical axis, together with said rotation cylinder, said pinion transmitting said rotation of said shaft to said rotation cylinder;

a contact guide portion formed on said shaft for allowing said pinion to slidably move on said contact guide portion;

a non-contact portion formed on said shaft which does not contact said pinion; and, anti-reflection means formed on said non-contact portion for preventing light from being reflected on said non-contact portion.

2. The anti-reflection structure for a zoom lens barrel of claim 1, wherein said anti-reflection means comprises a matte surface formed on said non-contact portion.

3. The anti-reflection structure for a zoom lens barrel of claim 1, further comprising:

a movable cylinder rotatably engaging said rotation cylinder and linearly guided in said optical axis direction;

a guide member rotatable in relation to said rotation cylinder and movable in said optical axis direction together with said rotation cylinder; and a straight guide formed on said movable cylinder;

a member formed on said guide member for engaging said straight guide, wherein one end of said shaft is supported on said movable cylinder and said shaft is further supported on said guide member with said guide member slidable on said shaft in an axial direction of said shaft.

4. The anti-reflection structure for a zoom lens barrel of claim 1, wherein said contact guide portion comprises side surfaces of a tapered key groove, excluding a bottom surface of said tapered key groove, wherein said tapered key groove is formed on said shaft and extends along said shaft.

5. An anti-reflection structure for a zoom lens barrel, comprising:

a first cylinder guided in a direction of an optical axis;

a second cylinder fitted in said first cylinder such that said second cylinder moves with respect to said first cylinder;

a member positioned in said second cylinder and movable together with said second cylinder in said optical axis direction without rotating with respect to said first cylinder;

a shaft positioned inside said first cylinder and extending in a direction parallel to said optical axis, wherein one end of said shaft is supported on said first cylinder;

a pinion supported on said member and fitted on said shaft to be slidable in an axial direction of said shaft; and a non-contact surface formed on said shaft and extending along said shaft, said non-contact surface not coming into contact with said pinion, wherein said non-contact surface is matted so that light may not reflect on said non-contact surface.

6. An anti-reflection structure for a zoom lens barrel comprising:

a first rotation cylinder;

a movable cylinder linearly movable in a direction of an optical axis by a rotation of said first rotation cylinder;

a second rotation cylinder rotatably engaging said movable cylinder and movable in said optical axis direction with respect to said movable cylinder, when rotated;

front and rear lens groups movable in said optical axis direction along a predetermined path by a rotation of said second rotation cylinder to thereby change a focal length;

a first pinion rotatably supported on said movable cylinder;

a second pinion rotatably supported on said second rotation cylinder;

a shaft for transmitting a rotation of one of said first and second pinions to the other, wherein said second pinon fits on said shaft such that said second pinion is slidable on said shaft in an axial direction of said shaft;

an anti-reflection portion formed on each of said movable cylinder and said second rotation cylinder for preventing internal reflection from occurring inside said zoom lens barrel, said internal reflection being caused by said shaft.

7. The anti-reflection structure for a zoom lens barrel of claim 6, wherein said movable cylinder is provided with a gear supporting plate for supporting said first pinion in combination with said movable cylinder, wherein said second rotation cylinder is provided with a guide member for supporting said second pinion in combination with said second rotation cylinder, wherein said shaft is supported by said gear supporting plate and said guide member, at least one end of said shaft being supported in a slidable manner in said optical axis direction, and wherein said anti-reflection portions comprise a pair of light interrupting plates which project from said gear supporting plate and said guide member, respectively, and each extend in a direction parallel to said optical axis.

8. The anti-reflection structure for a zoom lens barrel of claim 7, wherein said light interrupting plates overlap with each other when said light interrupting plates approach each other, and wherein said light interrupting plates do not overlap each other, when tip portions of said light interrupting plates are spaced apart from each other in said optical axis direction when said light interrupting plates spaced away from each other during a zooming operation.

9. The anti-reflection structure for a zoom lens barrel of claim 6, wherein said shaft is provided with a contact guide portion for allowing said second pinion to slide thereon in said axial direction of said shaft, and a non-contact portion with which said second pinion does not come into contact while sliding on said contact guide portion, a matte surface formed on said non-contact portion.

10. An anti-reflection structure for a zoom lens barrel, comprising:

a rotation transmitting shaft positioned in said zoom lens barrel and rotated by a drive source;

a pinion fitted on said rotation transmitting shaft and slidable in an axial direction thereof so as to move in a direction parallel to an optical axis of a zoom lens;

a contact guide portion formed on said rotation transmitting shaft for allowing said pinion to slidably move on said contact guide portion;

a non-contact portion formed on said rotation transmitting shaft which does not contact said pinion; and, anti-reflection means formed on said non-contact portion for preventing light from being reflected on said non-contact portion.

11. An anti-reflection structure for a zoom lens barrel, comprising:

a rotation transmitting shaft positioned in said zoom lens barrel and rotated by a drive source, said rotation transmitting shaft having a non-circular cross section;

a pinion provided with a non-circular hole in which said rotation transmitting shaft is fitted in a slidable manner in an axial direction thereof so as to move on said shaft in a direction parallel to an optical axis of a zoom lens and to rotate together with said shaft;

a contact guide portion formed on said rotation transmitting shaft for allowing said pinion to slidably move on said contact guide portion;

a non-contact portion formed on said rotation transmitting shaft which does not contact said pinion; and, an anti-reflection means formed on said non-contact portion for preventing light from being reflected on said non-contact portion.

12. An anti-reflection structure for a zoom lens barrel, comprising:

a movable cylinder linearly movable in a direction of an optical axis;

a movable member linearly movable in a direction of said optical axis with respect to said movable cylinder;

a first pinion rotatably supported on said movable cylinder;

a second pinion rotatably supported on said movable member;

a shaft for transmitting a rotation of one of said first and second pinions to the other, wherein said second pinion fits on said shaft such that said second pinion is slidable on said shaft in an axial direction of said shaft; and an anti-reflection portion formed on each of said movable cylinder and said movable member for preventing internal reflection caused by said shaft, each of said anti-reflection portions extending in a direction of said shaft.

* * * * *

UNITED STATES PATENT AND TRADEMARK OFFICE
CERTIFICATE OF CORRECTION

PATENT NO. : 5,604,638
DATED : February 18, 1997
INVENTOR(S) : H. NOMURA et al.

It is certified that error appears in the above-indentified patent and that said Letters Patent is hereby corrected as shown below:

On the cover, in section [56], "References Cited", "U.S. PATENT DOCUMENTS", insert ---3,951,522   4/1976 Hashimoto.......... 359/694---.

On the cover, in section [56], "References Cited", "U.S. PATENT DOCUMENTS", insert ---4,340,280   7/1982 Isobe.......... 359/823---.

Signed and Sealed this

Thirteenth Day of May, 1997

*Attest:*

BRUCE LEHMAN

*Attesting Officer*       *Commissioner of Patents and Trademarks*